(12) United States Patent
Li et al.

(10) Patent No.: US 9,418,091 B2
(45) Date of Patent: Aug. 16, 2016

(54) DATABASE OPERATIONS ON A COLUMNAR TABLE DATABASE

(71) Applicants: Wen-Syan Li, Fremont, CA (US); Bin Dong, Shanghai (CN); Zheng Long Wei, Shanghai (CN); Yingyu Chen, Shanghai (CN); Yongyuan Shen, Shanghai (CN)

(72) Inventors: Wen-Syan Li, Fremont, CA (US); Bin Dong, Shanghai (CN); Zheng Long Wei, Shanghai (CN); Yingyu Chen, Shanghai (CN); Yongyuan Shen, Shanghai (CN)

(73) Assignee: SAP SE, Walldorf (DE)

( * ) Notice: Subject to any disclaimer, the term of this patent is extended or adjusted under 35 U.S.C. 154(b) by 287 days.

(21) Appl. No.: 14/033,203

(22) Filed: Sep. 20, 2013

(65) Prior Publication Data

US 2015/0074066 A1 Mar. 12, 2015

(30) Foreign Application Priority Data

Sep. 6, 2013 (CN) .......................... 2013 1 0403089

(51) Int. Cl.
*G06F 17/30* (2006.01)

(52) U.S. Cl.
CPC ................................ *G06F 17/30315* (2013.01)

(58) Field of Classification Search
CPC ................................................. G06F 17/30315
USPC ........................................................ 707/693
See application file for complete search history.

(56) References Cited

U.S. PATENT DOCUMENTS

| | | | | |
|---|---|---|---|---|
| 5,960,194 A * | 9/1999 | Choy | ...................... | G06F 9/355 |
| 6,591,266 B1 * | 7/2003 | Li | ...................... | G06F 17/30902 |
| 7,496,589 B1 * | 2/2009 | Jain | ...................... | G06F 17/30315 |
| 7,856,530 B1 * | 12/2010 | Mu | ...................... | G06F 12/0888 |
| | | | | 711/119 |
| 8,145,614 B1 * | 3/2012 | Zimran | ............. | G06F 17/30132 |
| | | | | 370/252 |
| 8,260,767 B2 * | 9/2012 | Ruzak | ................ | G06F 17/3056 |
| | | | | 707/713 |
| 8,478,731 B1 * | 7/2013 | Throop | ............. | G06F 17/30153 |
| | | | | 707/693 |
| 8,819,309 B1 * | 8/2014 | Bruce | .................. | G06F 13/385 |
| | | | | 710/11 |
| 2007/0283086 A1 * | 12/2007 | Bates | ................... | G06F 3/0613 |
| | | | | 711/113 |
| 2008/0040554 A1 * | 2/2008 | Zhao | .................... | G06F 12/126 |
| | | | | 711/133 |
| 2009/0177622 A1 * | 7/2009 | Hu | ..................... | G06F 17/30336 |
| 2009/0327607 A1 * | 12/2009 | Tetrick | ............... | G06F 12/0868 |
| | | | | 711/118 |
| 2010/0161569 A1 * | 6/2010 | Schreter | ........... | G06F 17/30327 |
| | | | | 707/696 |
| 2010/0235335 A1 * | 9/2010 | Heman | ............. | G06F 17/30345 |
| | | | | 707/703 |
| 2010/0274768 A1 * | 10/2010 | Wang | ................ | G06F 17/30575 |
| | | | | 707/676 |
| 2012/0117064 A1 * | 5/2012 | Draese | ............. | G06F 17/30592 |
| | | | | 707/737 |
| 2012/0221528 A1 | 8/2012 | Renkes et al. | | |
| 2013/0117247 A1 | 5/2013 | Schreter et al. | | |

OTHER PUBLICATIONS

SAP, "How to Delta Merge for SAP HANA and SAP NetWeaver BW powered by SAP HANA", SAP How-to-Guide, Business Analytics, SAP HANA Appliance, May 2013, 28 pages.

Hindelang, "Delta merge on SAP HANA", HANA Adoption Room Webinar Series, Jun. 8, 2013, 21 pages.

* cited by examiner

*Primary Examiner* — Sheree Brown

(74) *Attorney, Agent, or Firm* — Brake Hughes Bellermann LLP

(57) ABSTRACT

A computer system includes at least one processor and at least one memory operably coupled to the at least one processor. The memory includes a memory pool and a database partitioned into multiple fragments. Each of the fragments is allocated a block of memory from the memory pool and the fragments store compressed data in a columnar table format. A database operation is applied in a compressed format to the compressed data in at least one of the fragments.

17 Claims, 10 Drawing Sheets

4) Sparse Encoding

Uncompressed | 4 | 4 | 4 | 3 | 3 | 1 | 0 | 0 | 0 | 4 | 4 | 4 | 4 | 0 | v
Sparse Ecnoded | 4 | | 3 | 3 | 1 | 0 | 0 | 0 | 0 |

Bitvector    11100000011110

Removes the value v which occurs most often. Bit vector indicates positions of v in the original sequence

FIG. 9

DATABASE OPERATIONS ON A COLUMNAR TABLE DATABASE

CROSS REFERENCE TO RELATED APPLICATIONS

This application claims priority under 35 U.S.C. §119 to Chinese Patent Application 201310403089.1, filed Sep. 6, 2013, titled "DATABASE OPERATIONS ON A COLUMNAR TABLE DATABASE," which is incorporated herein by reference in its entirety.

TECHNICAL FIELD

This description relates to systems and techniques for performing database operations on a database organized in columnar tables.

BACKGROUND

A database may be organized in different formats. For example, a database with support for a two-dimensional table may be organized in a row table format or it may be organized in column table (also referred to as a columnar table) format. For example, in a database that is formatted in a row table, the storage sequence of the data is row by row. In a database that is formatted in a column table, the storage sequence is column by column. A database formatted as a column table may have advantages over a database formatted as a row table. For example, a columnar table may provide advantages when the database includes huge amounts of data and the data needs to be aggregated and analyzed. A columnar table also may provide other advantages over other types of tables.

Despite the advantages of a columnar table, there may be shortcomings in the columnar table where improvement is desirable. For example, some database operations may create and consume more memory than desirable and create additional processing load. Improvements may be sought to limit the memory consumption of a columnar table and to increase processing efficiency for the columnar table.

SUMMARY

According to one general aspect, a computer system includes at least one processor and at least one memory operably coupled to the at least one processor. The memory includes a memory pool and a database partitioned into multiple fragments. Each of the fragments is allocated a block of memory from the memory pool and the fragments store compressed data in a columnar table format. A database operation is applied in a compressed format to the compressed data in at least one of the fragments.

Implementations may include one or more of the following features. For example, the database operation may include an insert operation, where the insert operation causes appending of new data in compressed format to a last row in one of the fragments. The memory may include a change log that is configured to store uncompressed data and the database operation may include a read operation. The read operation causes reading the compressed data from at least one of the fragments, decompressing the compressed data, reading the change log for associated data and combining the decompressed data from the fragment with the associated data from the change log. The memory may include a change log that is configured to store uncompressed data and the database operation may include an update operation. The update operation causes locating a corresponding row of data in one of the fragments, if a memory space in the fragment is sufficient to include one or more updated values in the data in compressed format, compressing the updated values and replacing the updated values in the data and if the memory space in the fragment is not sufficient to include the updated values in the data in compressed format, recording the updated values in the change log in an uncompressed format. The database may be configured to compress the data in the change log and merge the compressed data from the change log with the compressed data in the fragments. The database may include a compression engine that is configured to compress data using one of multiple compression schemes. The compression engine may use a dictionary encoding scheme to compress the data stored in the fragments. The database may be an in-memory database.

In another general aspect, a method includes partitioning a database into multiple fragments, where each of the fragments is allocated a block of memory from a memory pool. Compressed data is stored in each of the fragments in a columnar table format. A database operation is applied in a compressed format to the compressed data in at least one of the fragments.

Implementations may include one or more of the following features. The database operation may include an insert operation and the method may further include, responsive to the insert operation, appending new data in compressed format to a last row in one of the fragments.

The database operation may include a read operation and the method may further include, responsive to the read operation, reading the compressed data from at least one of the fragments, decompressing the compressed data, reading a change log for associated data, where the change log is configured to store uncompressed data and combining the decompressed data from the fragment with the associated data from the change log. The database operation may include an update operation and the method may further include, responsive to the update operation, locating a corresponding row of data in one of the fragments, if a memory space in the fragment is sufficient to include one or more updated values in the data in compressed format, compressing the updated values and replacing the updated values in the data and if the memory space in the fragment is not sufficient to include the updated values in the data in compressed format, recording the updated values in a change log in an uncompressed format, wherein the change log is configured to store uncompressed data. The method may further include compressing the data in the change log and merging the compressed data from the change log with the compressed data in the fragments. The method may further include compressing data using one of a plurality of compression schemes. The compression schemes may include a dictionary encoding scheme.

In another general aspect, a computer program product is, tangibly embodied on a non-transitory computer-readable storage medium and includes instructions that, when executed, are configured to partition a database into multiple fragments, where each of the fragments is allocated a block of memory from a memory pool, store compressed data in each of the fragments in a columnar table format and apply a database operation in a compressed format to the compressed data in at least one of the fragments.

Implementations may include one or more of the following features. For example, the database operation may include an insert operation and the instructions, when executed, may be further configured to, responsive to the insert operation, append new data in compressed format to a last row in one of the fragments. The database operation may include a read operation and the instructions, when executed, may be further configured to, responsive to the read operation, read the compressed data from at least one of the fragments, decompress of the compressed data, read a change log for associated data, where the change log is configured to store uncompressed data and combine the decompressed data from the fragment with the associated data from the change log. The database operation may include an update operation and the instructions, when executed, may be further configured to, responsive to the update operation, locate a corresponding row of data in one of the fragments, if a memory space in the fragment is sufficient to include one or more updated values in the data in compressed format, compress the updated values and replace the updated values in the data and if the memory space in the fragment is not sufficient to include the updated values in the data in compressed format, record the updated values in a change log in an uncompressed format, where the change log is configured to store uncompressed data. The instructions, when executed, may be further configured to compress the data in the change log and merge the compressed data from the change log with the compressed data in the fragments.

The details of one or more implementations are set forth in the accompanying drawings and the description below. Other features will be apparent from the description and drawings, and from the claims.

BRIEF DESCRIPTION OF THE DRAWINGS

FIG. 9 is an example illustration of a sparse encoding scheme.

DETAILED DESCRIPTION

Figure 1:
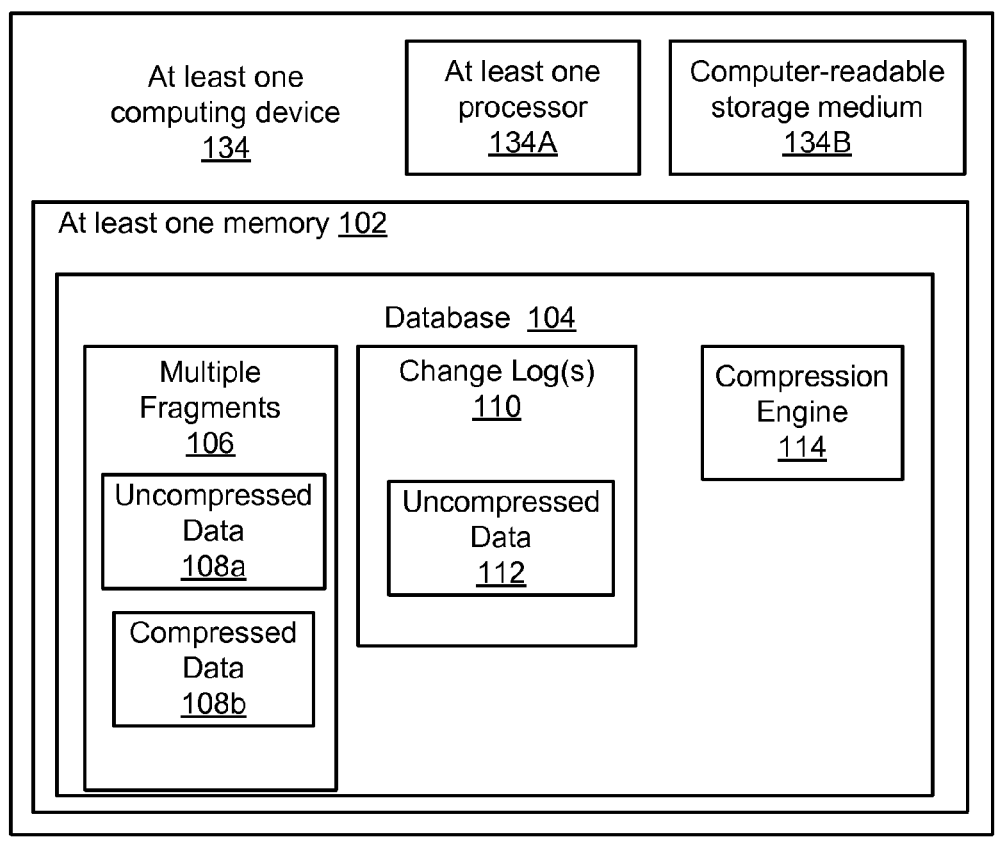
FIG. 1 is a block diagram of a database system.

FIG. 1 is an example block diagram of a database system 100. The database system 100 includes at least one memory 102. The memory 102 may be a non-volatile memory or other type of memory that is configured to store large amounts of data. The memory 102 may include non-volatile memory such as, for example, flash memory. The memory 102 also may include volatile memory such as, for example, random access memory (RAM). Although the memory 102 is illustrated as at least one memory, the memory 102 may be made up of multiple memory modules or arrays of memory modules. The memory 102 may include memory resources to provide a memory pool, where the memory pool may be divided and allocated to support various systems resident in the memory 102.

The data stored in the memory 102 may be organized into a database 104. The database 104 may be referred to as an in-memory database. As discussed above, the memory 102 may include a memory pool that may be used and allocated as needed to support the database 104. Also, as discussed above, the memory 102 may include multiple memory modules or memory arrays that may be configured to work in concert with one another to support the database 104 and database operations.

In one example implementation, the database 104 may be organized to store data in a column table format, also referred to as a columnar table. Data stored in a column format may be optimized for data aggregation and subsequent analysis on the aggregated data.

Each record in the database 104 may be identified by a unique identifier. A column of unique identifiers may be used to identify a particular row in the columnar table. For example, each record may be identified by a value identifier. The value identifier also may be referred to as a column identifier (ID).

Database operations may be performed or applied to the database 104. Database operations may include read operations, delete operations, insert operations, update operations and other types of database operations. Database operations will be explained in more detail below.

Queries may be received by the database 104 in the form of a database operation. For example, a query may be received in order to read data from the database as part of a read operation.

In one example implementation, the database 104 may be partitioned or divided into multiple fragments 106. Each of the fragments 106 may store a portion of the data organized in the database 104. Each of the multiple fragments 106 may be organized in a same or similar manner. For example, if the database 104 is organized in a column format, each of the partitioned fragments 106 may be organized in the same column format. Similarly, each record in a fragment may be identified by a unique identifier such as a column ID or value identifier as described above.

In one example implementation, each of the fragments 106 stores a different portion of the database 104. Each of the fragments 106 may be allocated a block of memory from the memory (or memory pool) 102. The blocks of memory allocated to the fragments may be of different sizes. In some cases, one fragment may be allocated a larger block of memory than another fragment. The allocation of the blocks of memory may be automatically configured based on a determined need for each of the fragments. In other implementations, the allocation of the blocks of memory may be manually configured by a database operator.

Database operations may be performed on each of the fragments 106. The database operations may be performed independent of database operations performed on other fragments. That is, by dividing the database 104 into multiple fragments 106, database operations performed on one of the fragments may not affect or be affected by database operations performed on the other fragments. Said another way, database operations may be limited to performance on a subset of the total fragments, including performing the operations on a single fragment.

In other example implementations, some of the fragments 106 may store the same data as other fragments to provide redundancy in the case of a failure in the database or to perform maintenance operations on the database.

Data stored in the fragments 106 in a column format may be stored as either uncompressed data 108a or compressed data 108b. A fragment 106 may include both uncompressed data 108a and compressed data 108b. A fragment 106 also may include only uncompressed data 108a or only compressed data 108b. When a fragment includes compressed data 108b, the data may be compressed according to one or more different compression schemes, as discussed in more detail below.

For a fragment 106 containing only uncompressed data 108a, all of the data may be stored in the fragment without the use of a change log to store some of the data. In this manner, the database operations may be performed only on the fragment 106 and not on any other tables, including change logs.

The following examples are provided for database operations performed on fragments containing uncompressed data 108a. In the provided examples, a column ID containing a value may be used to identify a particular record in the fragment 106. In one example implementation, a read operation may be performed. For a read operation on a fragment 106 containing uncompressed data 108a, the data is simply read from the fragment 106a containing the data. In contrast, read operations performed on other traditional column formatted databases on uncompressed data typically involved more steps. For example, a read operation on a traditional column formatted database may have required both a read of a main storage table and also a read from a delta storage table. However, in this example implementation, a read from a delta storage may no longer required because the data is all located in a single place, namely the fragment itself.

In another example implementation, a delete operation may be performed. In the example of a delete operation, a user may desire to delete one or more records in the database 104. When a delete operation is received, the database 104 will mark a delete identity (or identifier or other marker) on a record that is designated for deletion in one of the fragments 106. When a query to read data is received, the database will skip any record that has been identified or marked as deleted.

In another example implementation, an update operation may be performed. In the example of an update operation, it may be desired to update a record in the database 104 with a new value for that particular record. The database 104 first processes the update operation by identifying the corresponding column ID value for the row that contains the value to be updated. Once the corresponding row is identified, a key-value pair in the record is replaced with the updated value identified in the update operation. In this manner, the update operation is a simple process to identify the correct location for the value to be updated and to replace the current value with the updated value.

In another example implementation, an insert operation may be performed. In the example of an insert operation, a new record is to be inserted into the database 104. For the new record to be inserted, it is assigned a column ID and appended after a last row of the database 104. Thus, the new record becomes a last row in the database 104 (or fragment 106 if fragmented). The data is inserted directly into the database 104 and not into a delta merge storage table. In contrast, in prior traditional column table databases, multiple tables were required to perform certain types of database operations, including an insert operation. Data would not be inserted into the main storage but instead was inserted into a delta merge storage table. The use of both a main storage table and a delta storage table consumed more memory. Because the insert operation previously inserted data into a second table, an impact occurred on read operations in prior systems, since the read operation needed to read from both the main storage and the delta merge table.

Table 1 below provides an example pseudo code for performing database operations on a database 104 (or fragment 106) with uncompressed data. For example, the pseudo code in Table 1 may be applied to database 104 containing uncompressed data 108a.

TABLE 1

Pseudo Code

```
IF operation-type = READ
    Read data from storage
    Filter deleted data
ELSE IF operation-type = DELETE
    Find corresponding row and mark deleted identity
ELSE IF operation-type = UPDATE
    Find corresponding row and replace the key-value pair
ELSE IF operation-type = INSERT
    Append the result into the last row
```

When performing database operations on a database containing uncompressed data 108a, the database 104 may or may not be divided into multiple fragments 106. The database 104 may not be divided into multiple fragments because the operations can be performed directly onto the database without a need for creating a separate delta merge table to perform any of the operations.

The pseudo code described in Table 1 provides code for read operations, delete operations, update operations and insert operations. The pseudo code in Table 1 follows the description of these operations as described above. For instance, if the operation type is a read operation, then data is read directly from the storage (or directly from database 104) while filtering any data that has been marked for deletion.

If the operation type is a delete operation, then the corresponding row is identified and marked for deletion. When a row is marked for deletion, the row may not be removed permanently from the database. Instead, the row marked for deletion may be skipped when performing other operations, such as read operations.

If the operation is an update operation, the database identifies the corresponding row and replaces the key-value pair with an updated value identified in the update operation. If the operation is an insert operation, the database appends the new row directly to the database 104. As discussed above, the new row may be appended as the last row in the database 104. In this manner, new data that is inserted is inserted directly into the database 104 and not into a separate delta merge table.

While the pseudo code in Table 1 and other description above may apply to the situation of uncompressed data, database operations performed on compressed data, such as compressed data 108b, may be slightly more complex. As discussed above, the database 104 may first be partitioned into multiple fragments 106, with each of the fragments 106 including compressed data 108b. In this manner, database operations that are dependent on a memory space allocated to the fragment 106 may affect only the particular fragment and not the entire database. Thus, database operations that exceed the memory space of the fragment may affect that fragment and not any other fragments. In this manner, these types of changes are felt on a smaller scale rather than on a global scale for the entire database.

The database 104 may include a compression engine 114 that may be configured to perform compression and decompression operations on the data stored and to be stored in the database 104 (and fragments 106). The compression engine 114 may be configured to perform compression on the data using one of multiple different types of compression schemes. For example, the compression engine 114 may be configured to use a dictionary encoding compression scheme, a prefix encoding compression scheme, a run length encoding compression scheme, a cluster encoding compression scheme, a sparse encoding compression scheme, an indirect encoding compression scheme, and/or combinations of various schemes or other types of encoding compression schemes. The compression schemes may work to allow the database to function in a more efficient and space saving manner.

Database operations may be performed on fragments 106 containing compressed data 108b in the following manner. For certain operations, a change log or change logs 110 may be used. In some implementations, the change log stores uncompressed data 112. In other example implementations, the change log 110 may include data that uses only a basic compression scheme which may be less complex and not as efficient as the compression schemes used in the fragments 106.

In some example implementations, each of the multiple fragments 106 may have its own associated change log 110. In other example implementations, some of the fragments 106 may share a change log 110. In other example implementations, a single change log 110 may be used for all of the fragments 106.

For a delete operation performed on the compressed data 108b in one of the fragments 106, the database identifies a corresponding row in the fragment 106 and marks the row with a delete identifier. The delete operation performed on the compressed data 108b is the same as the delete operation performed on the uncompressed data 108a.

For a read operation performed on the compressed data 108b in one of the fragments 106, the database executes the read operation by reading the data from each fragment that may contain data associated with the operation. The compressed data 108b may be decompressed using, for example, the compression engine 114. The database may query the change log 110 for any associated data contained in the change log 110. The decompressed data from the fragments 106 and the data from the change log 110 may be combined and returned as part of the read operation. The read operation also may filter out any data that has been marked for deletion so that the results of the read operation do not include data that has been marked as deleted.

For an insert operation on the compressed data 108b in one of the fragments 106, the database 104 executes the insert operation by compressing the data using the compression engine 114 and then appending the compressed data directly into the fragment 106. The compressed new data may be appended after the last row in a particular fragment 106. In this manner, insert operations are performed directly on the fragments 106 containing the compressed data. Unlike previous database systems containing compressed data, a delta merge table is not used for insert operations because the insert operation is performed directly on the main data table (i.e., the fragment 106). In this manner, the size of the change log is reduced because insert operations are not performed on the change log 110 but are instead performed on the fragment 106 in a compressed format.

The compression engine 114 may compress new data to be inserted using one of multiple compression schemes. The compression scheme selected by the compression engine 114 may match the compression scheme used in a particular fragment 106. The compression engine 114 may select any of the compression schemes that a particular memory space allocation would accommodate for the particular fragment.

In some example implementations, data may be inserted into one of the fragments 106 in a batch mode. If there are batch data to be inserted, the data insert may occur at a same time. The database may determine whether to insert the batch data directly into the fragment by appending it at an end of the fragment or may determine whether to insert the batch data into the change log 110. Prior to inserting the batch data directly into the fragment 106, the compression engine 114 would compress the batch data and then the database 104 would append the newly compressed data to a last row of the fragment 106. The database 104 may determine or estimate an execution effort prior to selecting where to insert the batch data.

For an update operation on compressed data 108b in one of the fragments 106, the database executes the update operation by first finding a corresponding row containing the value that needs to be updated. The database 104 then determines if the memory space is sufficient to accommodate the updated value. If the memory space is sufficient to include the updated value in a compressed format, the database 104 causes the compression engine 114 to compress the new value. Then, the new compressed value is used to replace the key-value pair directly in the fragment 106. In this manner, update operations are performed directly on the compressed data 108b in the fragment 106. If the database 104 determines that the local memory space for the fragment 106 is not sufficient, then the updated value is recorded in the change log 110 in an uncompressed format as part of the uncompressed data 112. A subsequent read operation for this record containing the updated value would be performed by reading both the record in the fragment 106 in the compressed format and the record corresponding from the change log 110 containing the updated value in the uncompressed format.

The process of performing an update operation directly on the fragment 106 in a compressed format, without directly adding it to a delta merge table, is more efficient and can save more space than creating a large delta merge table as in previous typical database systems. In the example implementations described above regarding database operations on the compressed data, the update operation may be the only operation that causes data to be added to the change log 110. An insert operation (other than potentially a batch insert) may not cause data to be added to the change log 110. Instead, the data from an insert operation is compressed and inserted directly into the fragment 106.

For example, the compressed data for an update operation may be one size (e.g., 2 bytes), but the space allocated may only allow for one byte. In this situation, since the compressed value is larger than the allocated space, then the update operation is performed on the change log 110. In other situations, when the space in the fragment 106 is sufficient to accommodate the compressed value in the update operation, then the update operation is performed directly on the fragment 106 without using the change log 110.

Table 2 below provides an example pseudo code for performing database operations on a database with compressed data. For example, Table 2 pseudo code may be applied to database 104 containing compressed data 108b.

TABLE 2

| Pseudo Code |
| --- |
| IF operation-type = READ<br>    Read data from each fragment<br>    Decompress the data<br>    Query change log in the fragment and combine the data<br>    Filter deleted data<br>ELSE IF operation-type = DELETE<br>    Find corresponding row in fragment and mark deleted identity<br>ELSE IF operation-type = UPDATE<br>    Find corresponding row<br>    IF local memory space is enough THEN<br>        Compress new value<br>        Replace the key-value pair directly |

TABLE 2-continued

Pseudo Code

```
    ELSE
        Record this change into change log
        Merge it asynchronously during system idle time
    END
ELSE IF operation-type = INSERT
    Compress input data
Append the result after the last row
```

The example pseudo code listed in Table 2 above describes an algorithm for processing compressed data by first attempting to perform the database operation directly on one or more of the fragments 106. The pseudo code in Table 2 provides for database operations including read operations, delete operations, update operations, and insert operations.

For a read operation, the pseudo code instructs the database 104 to read the data from each fragment 106. The data in each fragment 106 is in a compressed format. The database 104 then decompresses the compressed data and queries the change log 110 in the fragment for any related data. The database 104 combines the data from the fragment 106 and data from the change log 110. Any data that has been marked for deletion is filtered and not included in the result that is returned as part of the read operation.

For a delete operation, the pseudo code instructs the database 104 to find the corresponding row in the fragment 106 and mark the row with a delete identity (or identifier). In this manner, as described above, the row will remain in the fragment, but will not be included in the results from other database operations. The row marked for deletion will be filtered out of other results.

For an update operation, the pseudo code in Table 2 instructs the database 104 to find the corresponding row in the fragment. The database 104 determines if there is enough local memory space within the fragment 106 to add the update directly into the fragment 106. If there is a local enough local memory space, then the new value in the update operation is compressed by the compression engine 114 and is used to replace the key-value pair directly in the row in the fragment 106. If the database 104 determines the local memory space is not enough, then the update value is recorded into the change log 110 as part of the uncompressed data 112.

At some time in the future, the change log 110 may be merged into the fragment 106. For example, the change log 110 may be merged asynchronously with the fragment 106 during an idle or lesser used time.

For an insert operation, the pseudo code in Table 2 instructs the database 104 to compress the new input data using the compression engine 114. The compressed new data is then appended after the last row directly in one of the fragments 106.

As discussed above with respect to the pseudo code in Table 1, batch data may be treated either by compressing the data in a batch mode and appending results after the last row directly in the fragment 106 or, the database 104 may determine that it is more efficient to insert the new data into the change log 110 and at a later time merged change log 110 with the fragment 106.

In the example of FIG. 1, the database system 100 is illustrated as being executed by at least one computing device 134, which is illustrated as including at least one processor 134A and a computer readable storage medium 134B. The computing device 134 may host the database system 100, where the computing device 134 may be a server or other computing device capable of hosting such a database system 100. The computing device 134 may include multiple computing devices, such as, multiple servers, that are operably coupled and configured to host the database system 100 across the multiple computing devices. The computing device 134 may be networked to other computing devices (not shown) such that the systems on the computing device 134 may send and receive information across a network (not shown), such as the Internet, a wide area network and/or a local area network.

Thus, the at least one processor 134A may represent two or more processors executing in parallel, and the computer-readable storage medium 134B may represent virtually any non-transitory medium that may be used to store instructions for executing database 104, and related data. Further, the at least one computing device 134 may represent two or more computing devices, which may be in communication with one another. In some implementations, each of the fragments 106 may be associated with a processor 134A such as in a multi-processor core environment.

The database 104 described in FIG. 1 may use multi-version concurrency control (MVCC) to ensure consistent read operations. Also, MVCC may be used to implement different transaction isolation levels. With multi-version concurrency control, concurrent read operation may be presented a consistent view of the database 104 without blocking concurrent write operations (e.g., insert operations). In some example implementations, a timestamp or other similar mechanism may be associated with each version of the database. The timestamp information may be used to determine which versions are visible for particular transactions. Deletion operations may be implemented by inserting a deletion version or by some other mechanism.

In one example implementation, a temporal fragment with a timestamp may be use to support and the MVCC. Prior to a transaction being committed to the database, the temporal fragment may not replace the original fragment in the storage. In this manner, multiple data versions will exist in the database for different transactions and connections. Even though tables may not be duplicated, the system can still guarantee the isolation level of the transaction.

Using the database 104 as described above with respect to FIG. 1, the database system can achieve better performance and use less memory compared to prior database systems. The database system 100 may reduce lots of unnecessary merges of a delta merge table and a main table and may be better applied when faced with limited memory resources.

Figure 2:
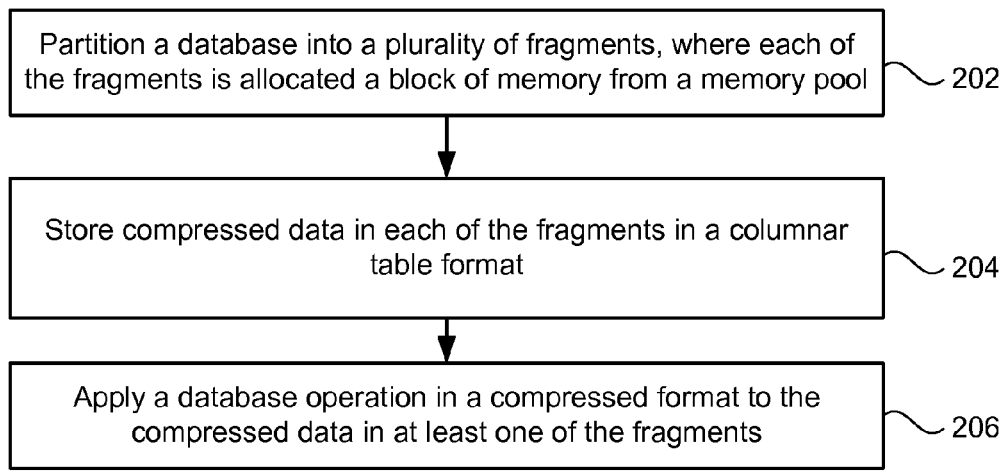
FIG. 2 is a flowchart illustrating example operations of the system of FIG. 1.

FIG. 2 is a flowchart 200 illustrating example operations of the system 100 of FIG. 1. In the example of FIG. 2, operations 202-206 are illustrated as separate, sequential operations. However, it may be appreciated that, in alternative embodiments, two or more of the operations 202-206 may be executed in a partially or completely overlapping or parallel manner, and/or in an iterative, nested, looped, or branched manner. Moreover, in any such implementations, additional or alternative operations may be included, while, in other implementations, one or more operations may be omitted.

As illustrated in FIG. 2, process 200 includes partitioning a database into a plurality of fragments, where each of the fragments is allocated a block of memory from a memory pool (202). For example, as described, the database 104 may be partitioned into a plurality of fragments 106. Each of the fragments 106 may be allocated a block of memory from the memory pool 102.

Figure 3:
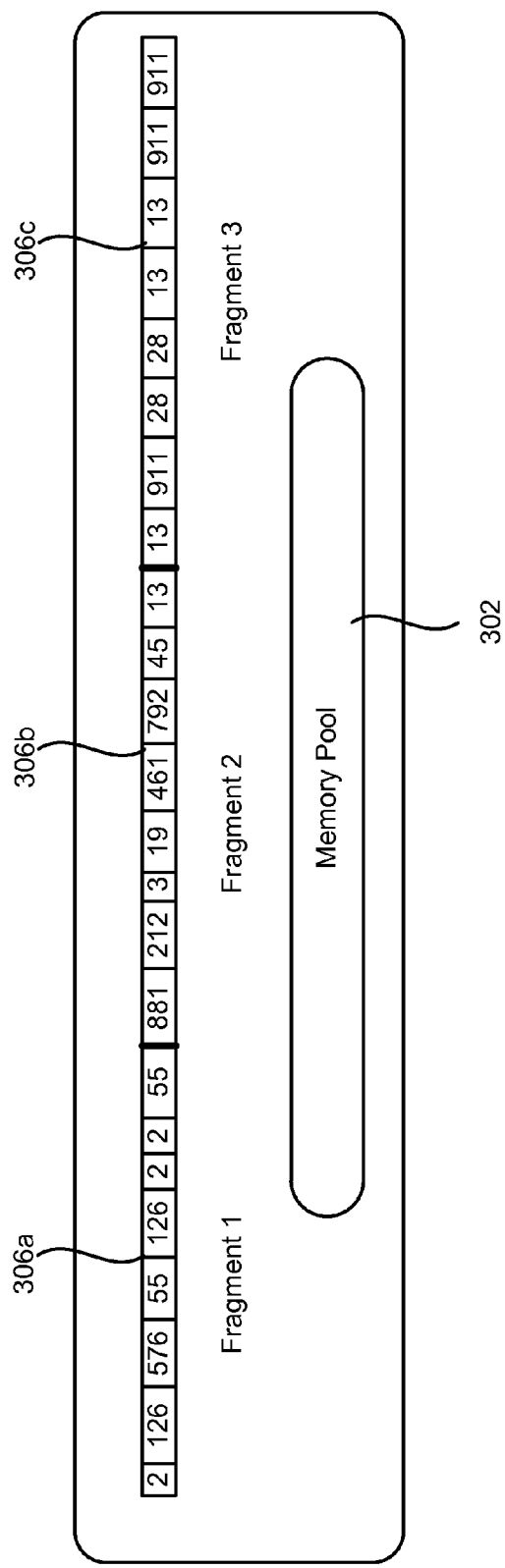
FIG. 3 is an example illustration of a memory pool allocated between multiple fragments.

Referring also to FIG. 3, an example allocation of the memory pool 302 is illustrated. The memory pool 302 is allocated among three fragments 306a-306c. The size of the fragments 306a-306c may be selected, either automatically or manually, to ensure sufficient size to accommodate when new data is inserted and/or updated into the fragment without having to move and reallocate data. As discussed above, the fragments 306a-306c are used so that database operations may be performed on each of the individual fragments instead of applying be database operations to the database as an undivided whole.

In this example implementation, a row ID range and fragment start address may be used to map each of the fragments into separate fragments. In this example, the length of each fragment 306a-306c is 8. The memory consumption for each item (cell) is the same, so the fragment start address may be calculated using this information.

In an example memory pool, many fragments may be preallocated. Additional fragments may be allocated is there is a need for more fragments. The additional fragments may be provided from among the pre-allocated fragments in the memory pool.

Referring back to FIG. 2, compressed data is stored in each of the fragments in a columnar table format (204). For example, as discussed, compressed data 108b may be stored in each of the fragments 106. Similarly, referring back to FIG. 3, compressed data may be stored in each of the fragments 306a-306c. The compressed data may be stored in the fragment using one of multiple different types of compression schemes.

The database operation may be applied in a compressed format to the compressed data in at least one of the fragments (206). For example, as discussed, a database operation may be performed using a compressed format of the data referred to in the database operation and applied to the compressed data 108b in one of the fragments 106. In some cases, a database operation may be performed across multiple different fragments 106. In each of the fragments 106, the database operation is first attempted to be applied directly to the fragment with the data from the database operation in a compressed format. For some database operations, if the memory allocated to a particular fragment is not sufficient to enable the database operation to be performed in a compressed format, then a change log 110 may be used. This may be the situation for an update operation where the database determines the memory space for the fragment cannot fit the compressed updated value.

Figure 4:
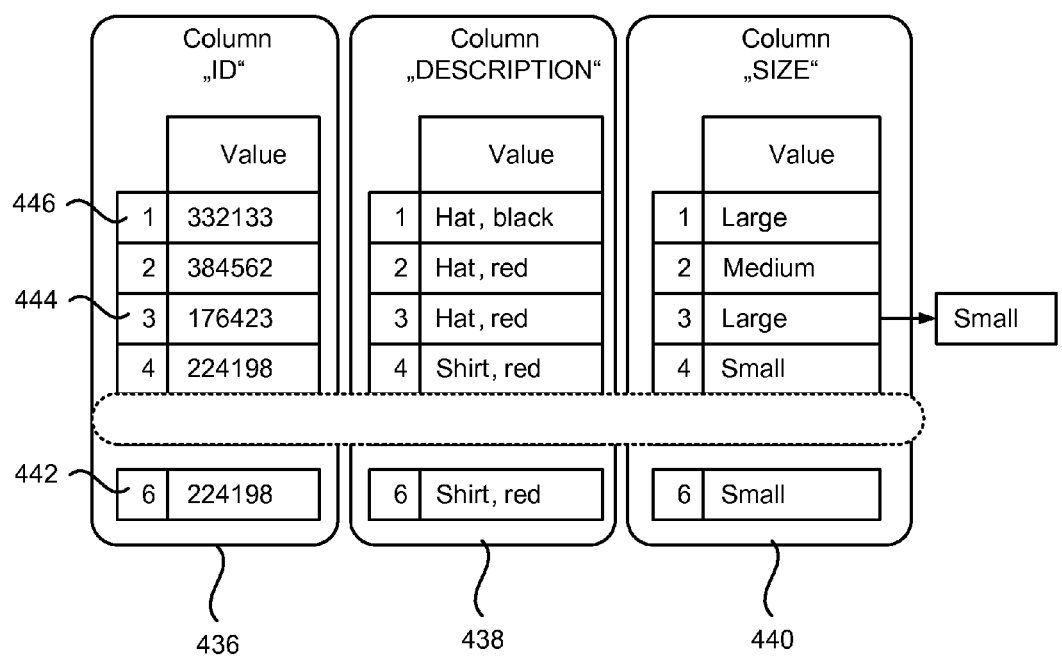
FIG. 4 is an example illustration of a fragment organized in a columnar format.

FIG. 4 illustrates an example fragment 406. Fragment 406 may correspond to one of the multiple fragments 106, as described above with respect to FIG. 1. As illustrated in FIG. 4, the fragment 406 may be labelled as table T1. The fragment 406 may be organized in a column format. In this example, the fragment 406 includes three columns: a column ID 436, a column description 438, and a column size 440. Each of the different columns includes different types of values. For example, the column ID column 436 includes a identifier for each of the rows. The identifier may be used to locate a particular record in the fragment 406. The column ID also may correspond to a column ID value contained in a change table. In this manner, read operations may be performed against the fragment 406 using the column ID as well as a change log containing the same column ID value.

As discussed above, database operations are performed and applied in a compressed format to the compressed data in the fragments. With respect to FIG. 4, for example, an insert operation may be applied directly to the fragment 406 by appending the inserts of the new data after a last row in the fragment 406. In this example, an insert operation may append the last row 442 after the last row in the column.

For an update operation, the update operation may be applied directly to the fragment 406. For example, an update operation may specify to change the column size value in row 3 (444) from "large" to "small." If the fragment 406 is in an uncompressed format, the change may be made directly by replacing the value "large" with the value "small." If the data is in a compressed format, the database may first determine whether there is enough memory space in the fragment 406 to accommodate the change. If there is enough space, then the new value is compressed and inserted directly into the table by replacing the value "large" with the value "small" in a compressed format. If there is not enough space, then the new value is added instead to a change log having a same column ID as the column ID in the fragment 406. A subsequent read operation would read from both the fragment 406 and the corresponding change log in order to return the correct values in response to the read operation.

For a delete operation, the row to be deleted is marked with a delete identifier. For example, if row 1 is to be deleted (446), then the row is marked with an identifier such that database operations will filter out row 1 as being deleted.

FIGS. 5-10 illustrate example encoding schemes that may be used to compress the data in the database 104. The encoding schemes may be used to compress the data in each of the partitioned fragments 106. As discussed above, a compression engine 114 may be used to compress the data and perform database operations to apply a compressed format of new or updated values directly to the existing compressed data in the fragment.

Figure 5:
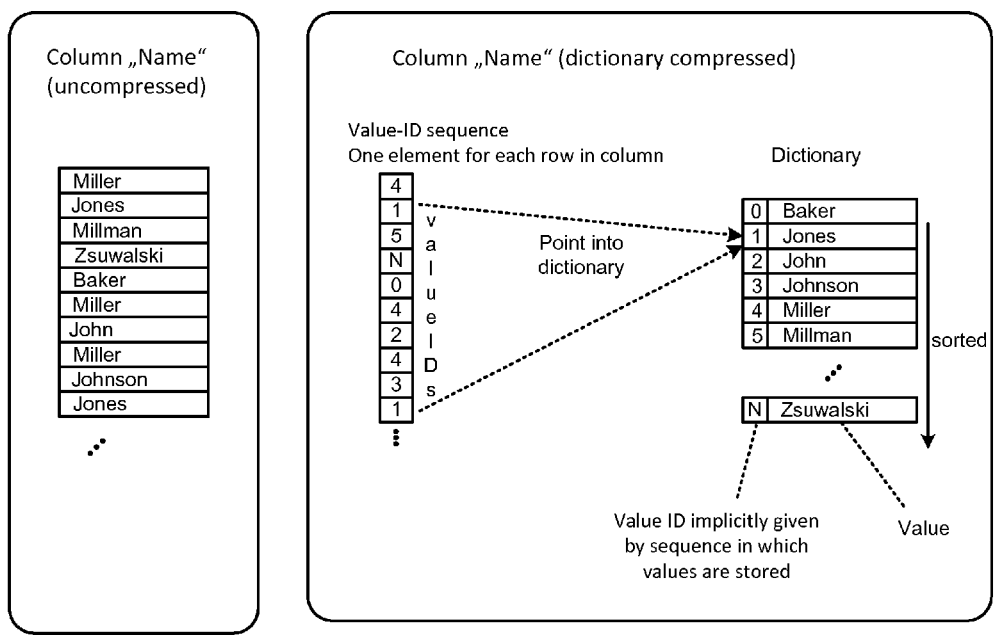
FIG. 5 is an example illustration of a dictionary encoding scheme.

For example, FIG. 5 illustrates an example dictionary encoding scheme 500. The database operations described above with respect to FIGS. 1 and 2 may be applied using the dictionary encoding scheme 500. In the dictionary encoding scheme, a dictionary table is used where each entry in the dictionary includes a value ID. Then, in the fragments 106, the value ID is inserted in place of the actual name. Any time the value is referred to a lookup may be performed by looking into the dictionary using the value ID. For insert operations using a dictionary encoding scheme, the new entry is appended as described above after a last row in the fragment. Prior to appending the new record, the entry is compressed according to the dictionary encoding scheme. For an update operation, the same process is applied as describe above with respect to the pseudo code described in Table 2. When it calls for compression of the updated value, the value would be compressed using the dictionary encoding scheme including adding a new entry to the dictionary table, should it be necessary.

Figure 6:
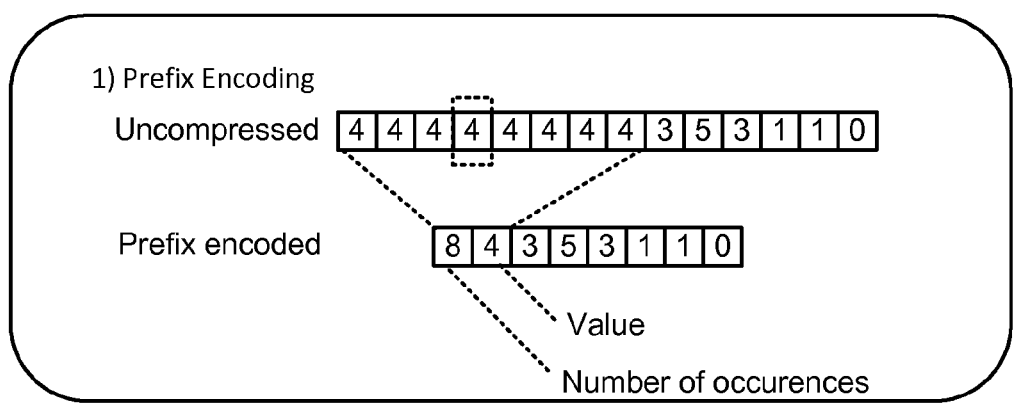
FIG. 6 is an example illustration of a prefix encoding scheme.

FIG. 6 illustrates an example prefix encoding compression scheme 600. In the prefix encoding scheme, if the column starts with a long sequence of the same value V, the sequence is replaced by storing the value once, together with the number of occurrences. For data read operations, the reads would read the data from the fragment and any change log. For data insert operations, new data would be compressed according to the prefix encoding compression scheme and appended to the end of the fragment. For the data delete operation, for example, if an item is to be deleted, the database system can mark an identifier on the row ID so it would not affect the compression results.

For an update operation, the same algorithm as described above in the pseudo code of Table 2 is followed. If the update value has sufficient memory space, then the update value is compressed according to the prefix encoding scheme and inserted directly into the record in compressed format. If the updated value does not have enough memory space, the updated value would not be compressed and instead would be inserted into a change log. In this example shown, the memory space may not be large enough to hold the new longer data. Instead of affecting the entire database 104, the updated value only affects the particular fragment and the change log associated with it. At a later time, a merge may be performed to reallocate the memory for the fragment to accommodate the larger size of the newer data contained in the change log. Then, the change log may be merged asynchronously with the fragment.

Figure 7:
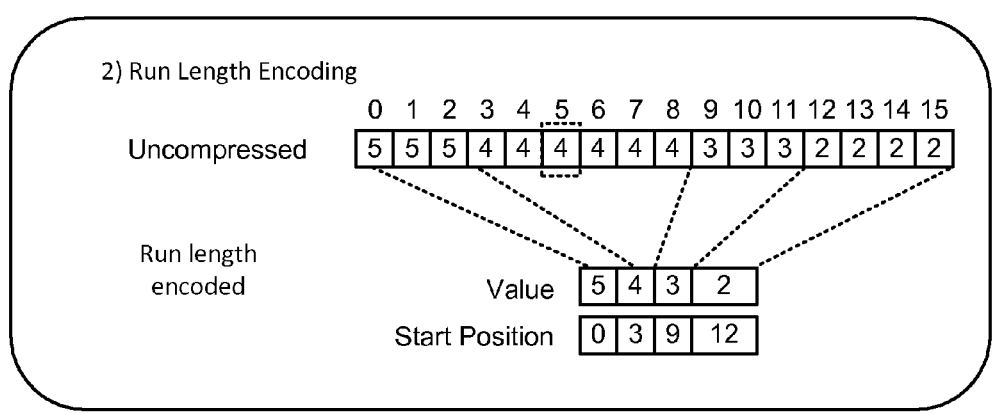
FIG. 7 is an example illustration of a run length encoding scheme.

FIG. 7. Illustrates an example run length encoding scheme 700. In a run length encoding scheme, the sequences of the same value are replaced with a single instance along with its start position. This example variant of run length encoding was chosen, as it speeds up access to storing the number of occurrences with each value. As discussed above with the other encoding schemes, insert operations may be appended to the fragment after compressing the new data according to the run length encoding scheme.

Figure 8:
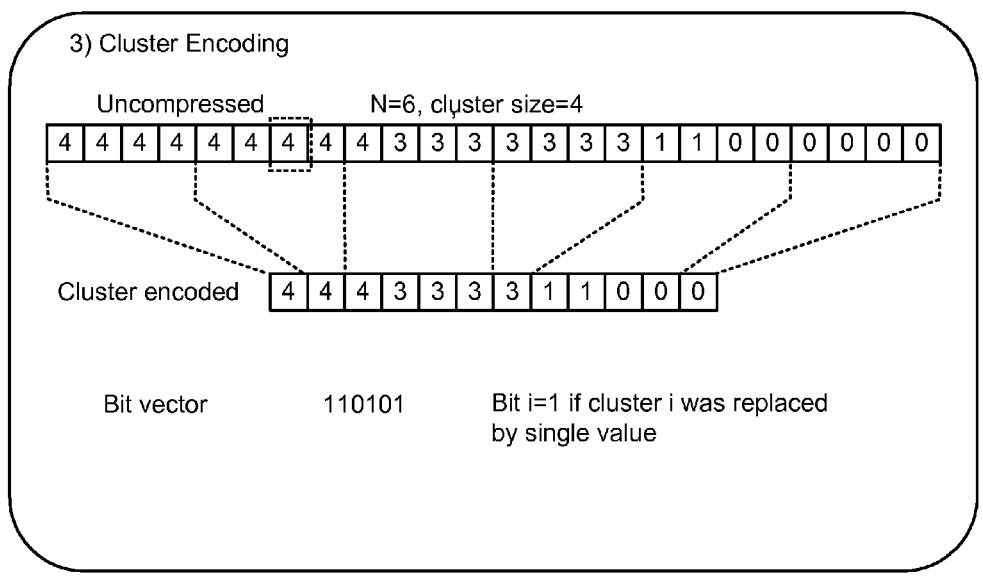
FIG. 8 is an example illustration of a cluster encoding scheme.

FIG. 8 illustrates an example cluster encoding scheme 800. Cluster encoding partitions the sequence into N blocks of fixed size (1024 elements). If a cluster contains only occurrences of a single value, the cluster is replaced by a single occurrence of that value. A bit vector length N indicates which clusters were replaced by a single value.

The cluster encoding is similar to prefix encoding in the handling of database operations. An update operation may break the compression result. The pseudo code described in Table 2 would be used to perform an update operation.

Figure 10:
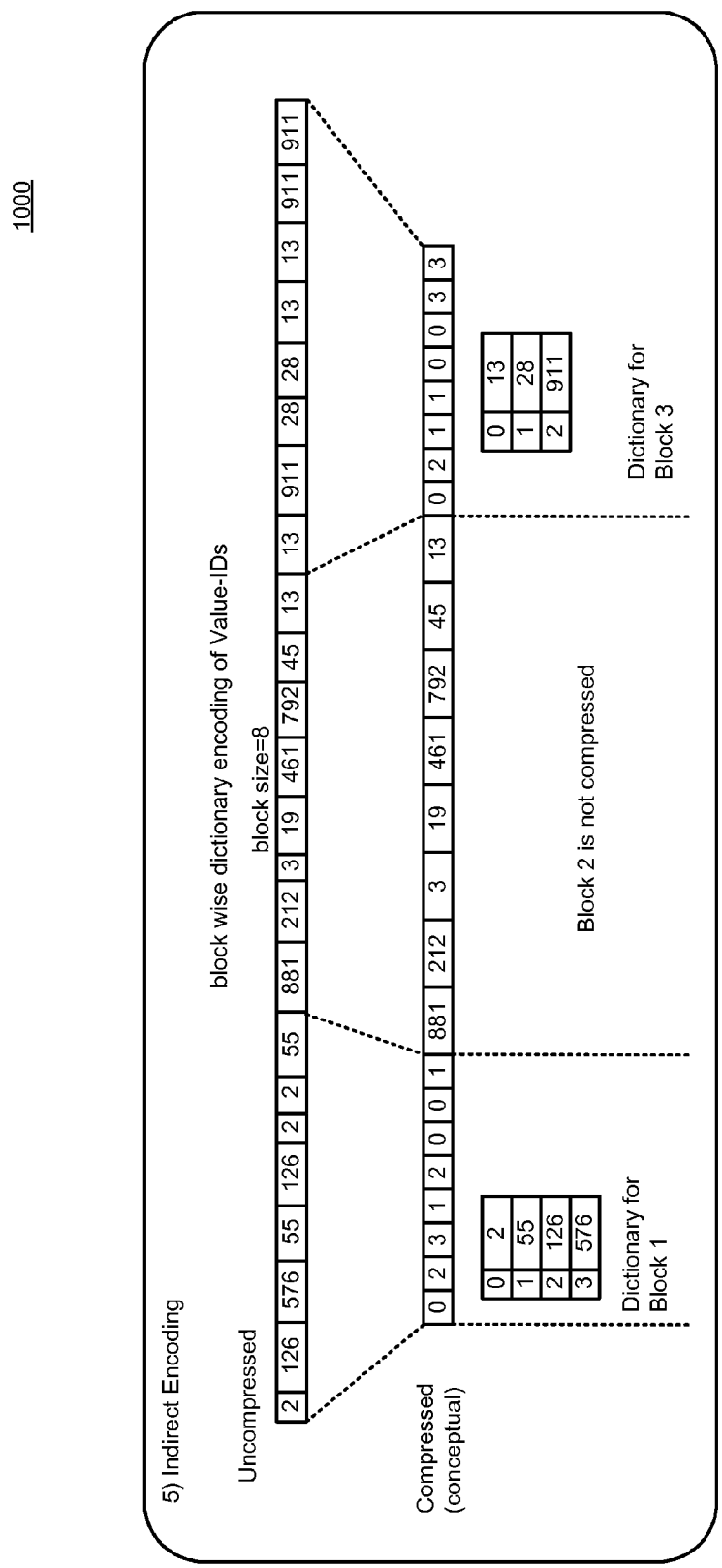
FIG. 10 is an example illustration of an indirect encoding scheme.

FIG. 9 illustrates an example sparse encoding compression scheme 900 and FIG. 10 illustrates an example in direct encoding compression scheme 1000. As discussed above, the pseudo code in Table 2 would be applied to a fragment using one or more of these compression schemes.

As can be seen from the examples of FIGS. 5-10, the compression scheme used in the fragment does not matter because any database operation that breaks the memory space allocated for the particular scheme is limited to one fragment and does not affect the entire database. In this manner, memory and CPU resources may be saved.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer system, comprising:
   at least one processor; and
   at least one memory operably coupled to the at least one processor, the memory comprising:
   a memory pool,
   a database partitioned into a plurality of fragments, wherein each of the fragments is allocated a block of memory from the memory pool and the fragments store compressed data in a columnar table format, and
   a change log that is configured to store uncompressed data,
   wherein a database operation is applied in a compressed format to the compressed data in at least one of the fragments, the database operation including
      an insert operation that causes inserting of new data in compressed format to one of the fragments, and
      an update operation that causes:
         locating a corresponding row of data in one of the fragments,
         if a memory space in the fragment is sufficient to include one or more updated values in the data in compressed format, compressing the updated values and replacing the updated values in the data, and if the memory space in the fragment is not sufficient to include the updated values in the data in compressed format, recording the updated values in the change log in an uncompressed format.

2. The computer system of claim 1, wherein:
the insert operation causes appending of the new data in compressed format to a last row in one of the fragments.

3. The computer system of claim 1, wherein:
the database operation includes a read operation, and
the read operation causes:
   reading the compressed data from at least one of the fragments,
   decompressing the compressed data,
   reading the change log for associated data, and
   combining the decompressed data from the fragment with the associated data from the change log.

4. The computer system of claim 1, wherein the database is configured to compress the data in the change log and merge the compressed data from the change log with the compressed data in the fragments.

5. The computer system of claim 1, wherein the database comprises a compression engine that is configured to compress data using one of a plurality of compression schemes.

6. The computer system of claim 5, wherein the compression engine uses a dictionary encoding scheme to compress the data stored in the fragments.

7. The computer system of claim 1, wherein the database is an in-memory database.

8. A method comprising:
partitioning a database into a plurality of fragments, wherein each of the fragments is allocated a block of memory from a memory pool;
storing compressed data in each of the fragments in a columnar table format;
applying a database operation in a compressed format to the compressed data in at least one of the fragments, wherein the database operation includes an insert operation and an update operation;
responsive to the insert operation, inserting new data in compressed format to one of the fragments; and
responsive to the update operation:
   locating a corresponding row of data in one of the fragments,
   if a memory space in the fragment is sufficient to include one or more updated values in the data in compressed format, compressing the updated values and replacing the updated values in the data, and
   if the memory space in the fragment is not sufficient to include the updated values in the data in compressed format, recording the updated values in a change log in an uncompressed format, wherein the change log is configured to store uncompressed data.

9. The method of claim 8, wherein inserting the new data further comprises:
responsive to the insert operation, appending the new data in compressed format to a last row in one of the fragments.

10. The method of claim 8, wherein the database operation includes a read operation and the method further comprises responsive to the read operation:

reading the compressed data from at least one of the fragments,
decompressing the compressed data,
reading the change log for associated data, wherein the change log is configured to store uncompressed data, and
combining the decompressed data from the fragment with the associated data from the change log.

11. The method of claim 8, further comprising:
compressing the data in the change log; and
merging the compressed data from the change log with the compressed data in the fragments.

12. The method of claim 8, further comprising compressing data using one of a plurality of compression schemes.

13. The method of claim 12, wherein the compression schemes include a dictionary encoding scheme.

14. A computer program product, the computer program product being tangibly embodied on a non-transitory computer-readable storage medium and comprising instructions that, when executed, are configured to:
partition a database into a plurality of fragments, wherein each of the fragments is allocated a block of memory from a memory pool;
store compressed data in each of the fragments in a columnar table format;
apply a database operation in a compressed format to the compressed data in at least one of the fragments, wherein the database operation includes an insert operation and an update operation;
responsive to the insert operation, insert new data in compressed format to one of the fragments; and
responsive to the update operation:
   locate a corresponding row of data in one of the fragments,
   if a memory space in the fragment is sufficient to include one or more updated values in the data in compressed format, compress the updated values and replace the updated values in the data, and
   if the memory space in the fragment is not sufficient to include the updated values in the data in compressed format, record the updated values in a change log in an uncompressed format, wherein the change log is configured to store uncompressed data.

15. The computer program product of claim 14, wherein the instructions, when executed, are further configured to:
responsive to the insert operation, append the new data in compressed format to a last row in one of the fragments.

16. The computer program product of claim 14, wherein the database operation includes a read operation and the instructions, when executed, are further configured to, responsive to the read operation:
read the compressed data from at least one of the fragments,
decompress the compressed data,
read the change log for associated data, wherein the change log is configured to store uncompressed data, and
combine the decompressed data from the fragment with the associated data from the change log.

17. The computer program product of claim 14 wherein, the instructions, when executed, are further configured to:
compress the data in the change log; and
merge the compressed data from the change log with the compressed data in the fragments.

* * * * *